(12) United States Patent
Miriyala et al.

(10) Patent No.: US 11,487,411 B2
(45) Date of Patent: Nov. 1, 2022

(54) CONTEXT-DRIVEN GROUP PILL IN A USER INTERFACE

(71) Applicant: ServiceNow, Inc., Santa Clara, CA (US)

(72) Inventors: Venkatram Reddy Miriyala, Hyderabad (IN); Ameya Sudhir Naik, Hyderabad (IN); Troy Azmoon, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/796,327

(22) Filed: Feb. 20, 2020

(65) Prior Publication Data

US 2021/0263641 A1   Aug. 26, 2021

(51) Int. Cl.
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
None
See application file for complete search history.

(56) References Cited

U.S. PATENT DOCUMENTS

| 6,609,122 | B1 | 8/2003 | Ensor |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,610,512 | B2 | 10/2009 | Gerber |
| 7,617,073 | B2 | 11/2009 | Trinon |
| 7,689,628 | B2 | 3/2010 | Garg |
| 7,769,794 | B2 * | 8/2010 | Moore ................. G06F 16/168 707/831 |
| 7,783,744 | B2 | 8/2010 | Garg |
| 7,890,802 | B2 | 2/2011 | Gerber |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 9,239,857 | B2 | 1/2016 | Trinon |
| 9,535,737 | B2 | 1/2017 | Joy |

(Continued)

*Primary Examiner* — Justin S Lee
(74) *Attorney, Agent, or Firm* — Fletcher Yoder PC

(57) ABSTRACT

Systems and methods for operating a graphical user interface with a dynamically sized group pill includes receiving a first indication of an opening of a context related to a first type of action in a graphical user interface. The group pill is expanded to an expanded size based at least in part on receiving the first indication. When a second indication of a closing of the context is received, the group pill is collapsed to a collapsed size displaying less information than the expanded size.

18 Claims, 17 Drawing Sheets

(56) References Cited

U.S. PATENT DOCUMENTS

| | | | |
|---|---|---|---|
| 9,557,969 B2 | 1/2017 | Sharma | |
| 9,792,387 B2 | 10/2017 | George | |
| 10,095,809 B2* | 10/2018 | Klein | G06F 16/907 |
| 2008/0065995 A1* | 3/2008 | Bell | G06F 40/117 |
| | | | 715/751 |
| 2009/0043789 A1* | 2/2009 | Gupta | G06F 16/48 |
| 2010/0042684 A1* | 2/2010 | Broms | G06F 3/0483 |
| | | | 709/204 |
| 2010/0211535 A1* | 8/2010 | Rosenberger | G06F 16/48 |
| | | | 706/20 |
| 2012/0221954 A1* | 8/2012 | Tanaka | G06F 16/248 |
| | | | 715/736 |
| 2012/0330728 A1* | 12/2012 | Enyeart | G06Q 10/00 |
| | | | 705/7.39 |
| 2014/0006416 A1* | 1/2014 | Leslie | G06F 16/248 |
| | | | 707/748 |
| 2016/0170609 A1* | 6/2016 | Bertram | G06F 16/26 |
| | | | 715/835 |
| 2016/0189077 A1* | 6/2016 | Azmoon | G06Q 10/109 |
| | | | 705/7.26 |
| 2017/0371534 A1* | 12/2017 | Baumecker | G06F 3/04883 |
| 2018/0329616 A1* | 11/2018 | Truelove | G06F 16/93 |
| 2019/0258706 A1* | 8/2019 | Li | G06F 3/0483 |
| 2019/0384472 A1* | 12/2019 | Wade | G06F 3/04817 |
| 2020/0364294 A1* | 11/2020 | Brown | G06F 40/263 |

\* cited by examiner

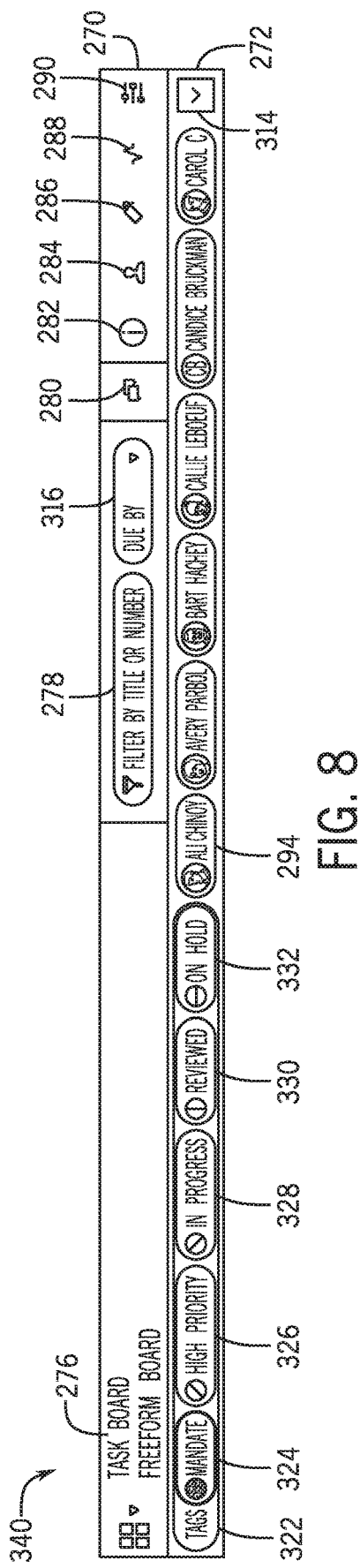
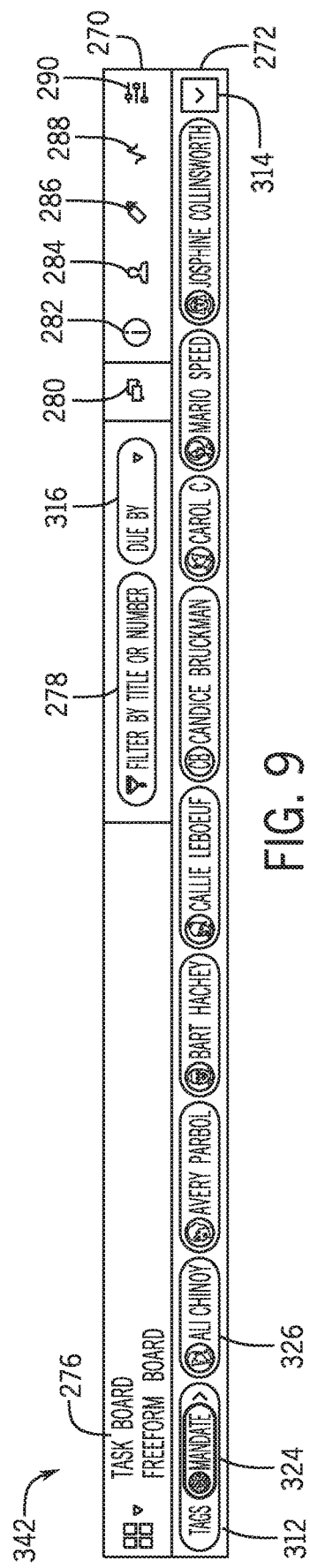
FIG. 8
FIG. 9

FIG. 15

CONTEXT-DRIVEN GROUP PILL IN A USER INTERFACE

BACKGROUND

The present disclosure relates generally to a context-driven collapse and/or expansion of a group pill in a user interface.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

IT operations management may be used to view and/or manage multiple different types of information. For example, IT business management (ITBM) may be used to gain visibility into portfolio management and strategies and/or to optimize resources while reducing time to get products to market. IT service management (ITSM) may be used to consolidate legacy systems to elevate the service experience, increase productivity, and achieve insights into service operations. IT operations management (ITOM) may be used to gain visibility into operations footprint, manage IT service health, and optimize delivery and spend. Regardless of which aspect of the IT services are being managed, insights may be provided via a user interfaces. However, the IT systems may include large amounts of data to be presented in the UIs that may overload and/or clutter the UI. Alternatively, a portion of the data present may be omitted from the UI. However, such removals may eliminate or inhibit features of the UI.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The discussion below relates to operating a graphical user interface with a dynamically sized group pill. When a first indication of an opening of a context related to a first type of action in a graphical user interface is received, the group pill is expanded to an expanded size. When a second indication of a closing of the context is received, the group pill is collapsed to a collapsed size displaying less information than the expanded size.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 8 is a portion of a GUI that includes an expanded group pill with a selected tag pill, in accordance with aspects of the present disclosure;

FIG. 9 is a portion of a GUI that includes a collapsed group pill with a selected tag pill, in accordance with aspects of the present disclosure;

FIG. 15 is a GUI showing a close of the filtering context of FIG. 14 in response to a completion of the movement of the card, in accordance with aspects of the present disclosure;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed below, a graphical user interface (GUI) may include a dynamically sized object that shows a dynamic amount of information. For instance, the object may include a "group pill." As used herein, a group pill may refer to any graphical object that is dynamically sized showing a dynamic amount of information (e.g., in pills) based on a context of actions in the GUI. For instance, in a filtering context, the pill may be expanded to show a different number of selectable pills inside of the group pill until a non-filtering action is performed to close the filtering context and collapse the group pill. Such techniques may be applied to other contexts applied to other types of actions, such as assignment actions, movement actions, pill-editing actions, and/or other such types of actions.

Figure 1:
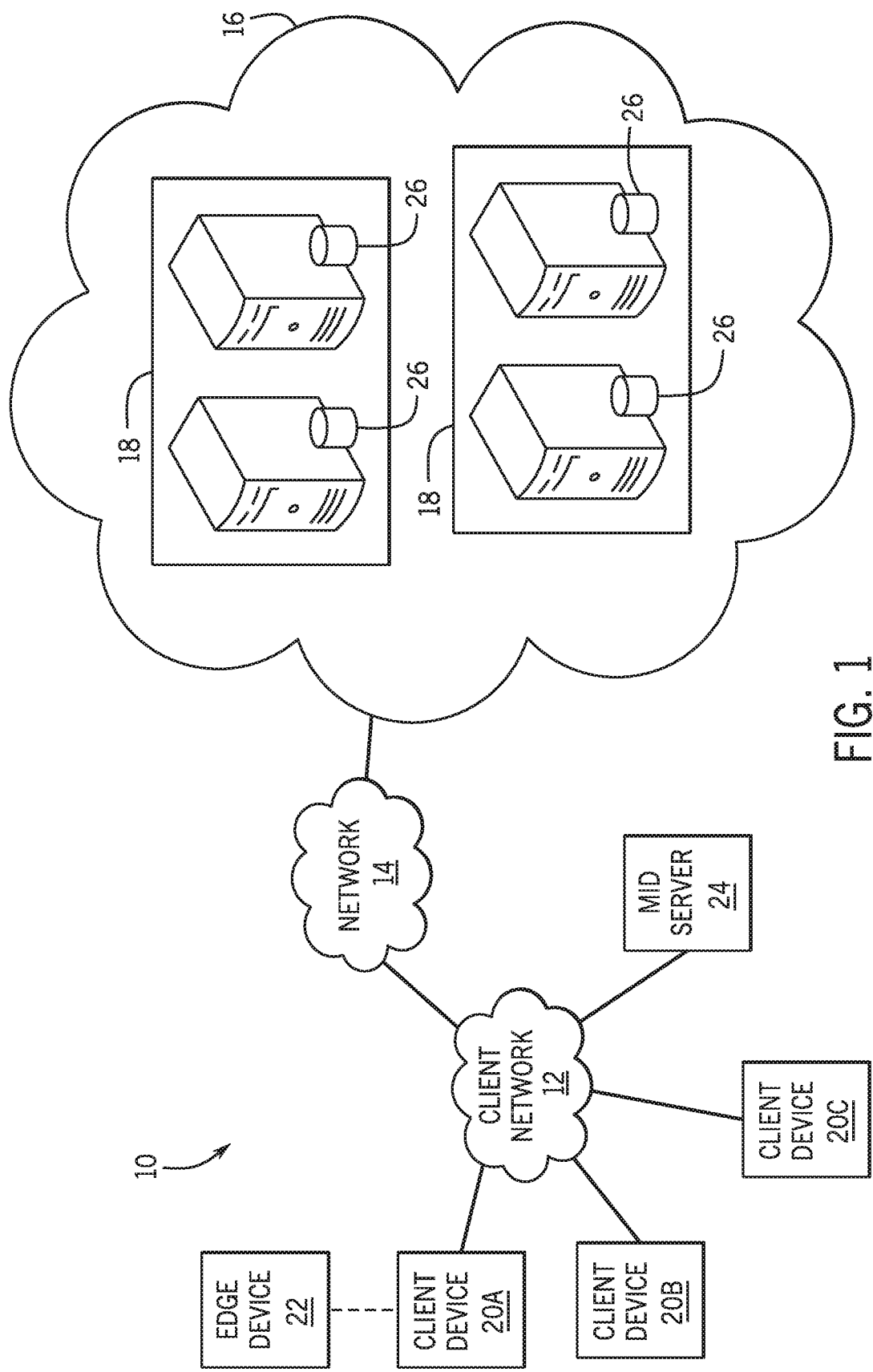
FIG. 1 is a block diagram of an embodiment of a multi-instance cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14 to provide cloud services to the client devices 20 from the platform 16.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of servers 26. The servers 26 may include virtual servers (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may configure the data centers 18 using a variety of computing infrastructures. In some embodiments, one or more of the data centers 18 are configured using a multi-tenant cloud architecture, such that one of the instances of the servers 26 handles requests from and serves multiple customers. Data centers 18 with multi-tenant cloud architecture comingle and store data from multiple customers, where multiple customer instances are assigned to one of the servers 26. In a multi-tenant cloud architecture, a particular server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual servers 26 and/or other combinations of physical and/or virtual servers, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
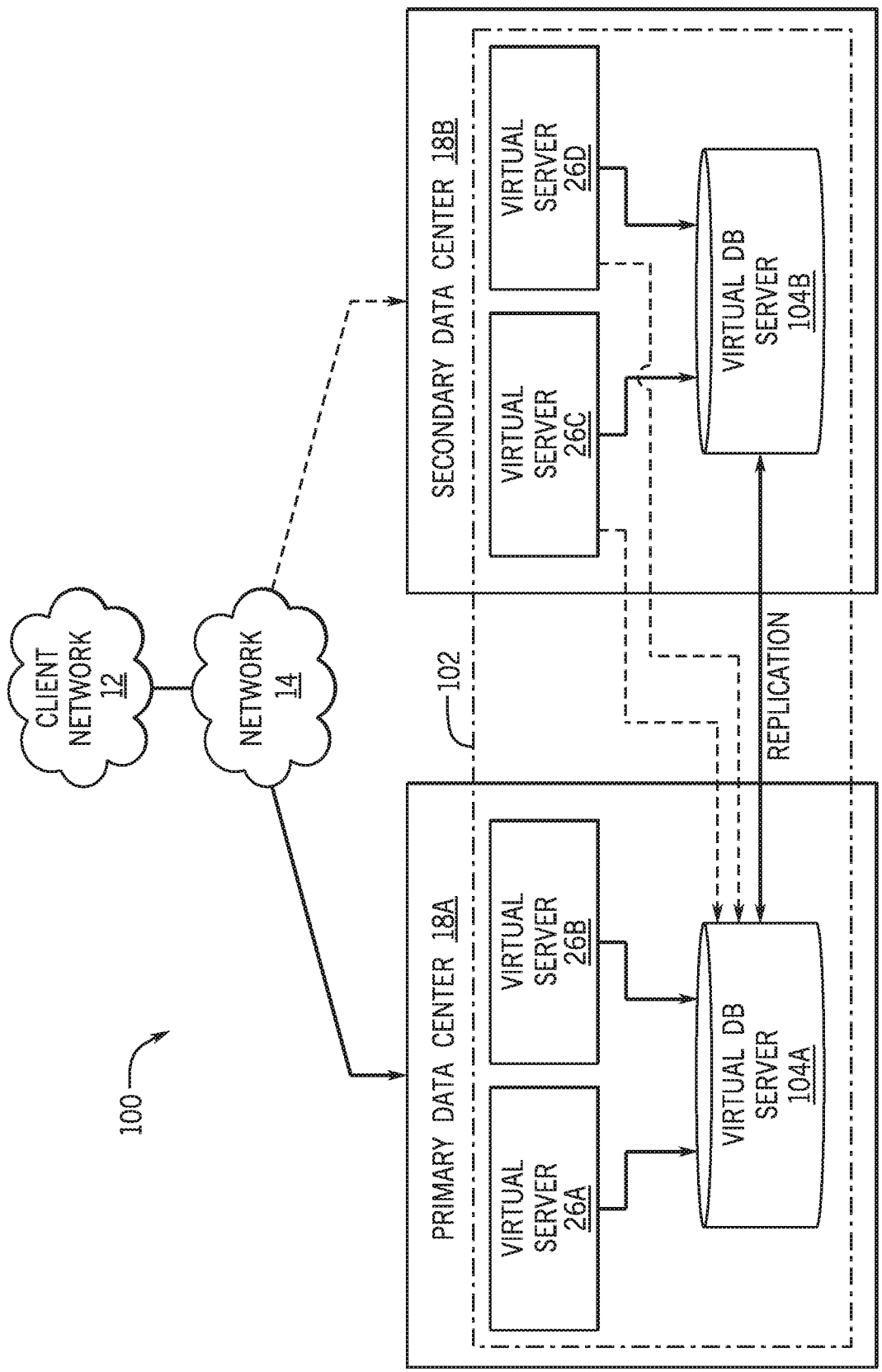
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated servers (e.g., servers 26A, 26B, 26C, and 26D) and dedicated database servers (e.g., database servers 104A and 104B). Stated another way, the servers 26A-26D and database servers 104A and 104B are not shared with other client instances and are specific to the respective client instance 102. In the depicted example, to facilitate availability of the client instance 102, the servers 26A-26D and database servers 104A and 104B are allocated to two different data centers 18A and 18B so that one of the data centers 18 may act as a backup data center. Other embodiments of the multi-instance cloud architecture 100 may include other types of dedicated servers, such as a web server. For example, the client instance 102 may be associated with (e.g., supported and enabled by) the dedicated servers 26A-26D, dedicated database servers 104A and 104B, and additional dedicated web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different servers into a single server or, conversely, perform operations attributed to a single server using multiple servers. For instance, using FIG. 2 as an example, the servers 26A, 26B, 26C, 26D and database servers 104A, 104B may be combined into a single server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
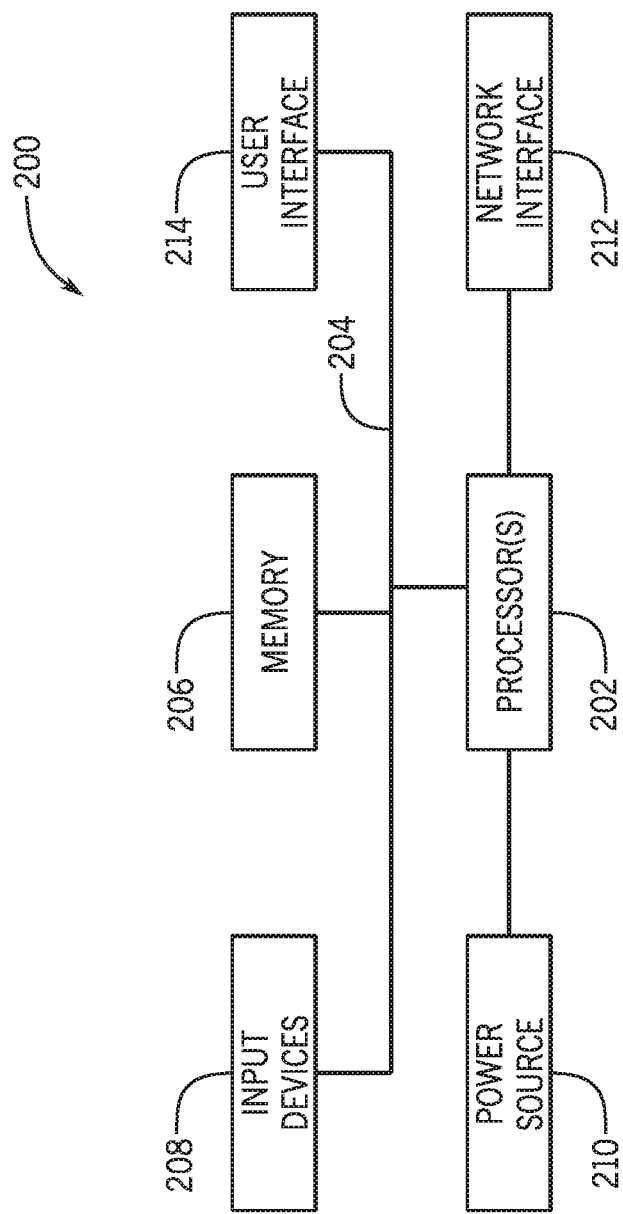
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the components depicted in FIG. 3. FIG. 3 generally illustrates a block diagram of example components of a computing system 200 and their potential interconnections or communication paths, such as along one or more buses. As illustrated, the computing system 200 may include various hardware components such as, but not limited to, one or more processors 202, one or more buses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more buses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
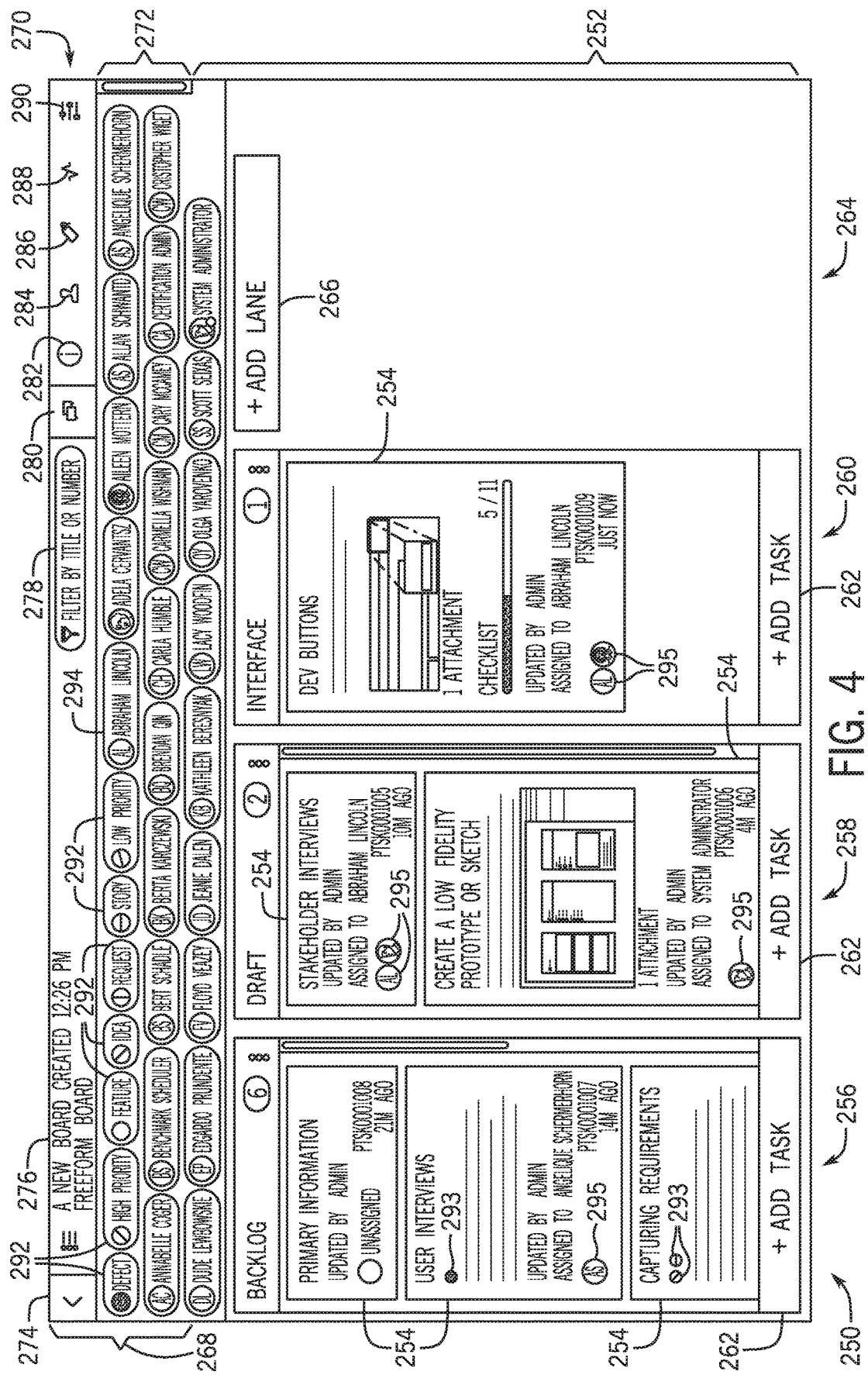
FIG. 4 is a graphical user interface (GUI) used to display information in the multi-instance cloud architecture, in accordance with aspects of the present disclosure.

As may be appreciated, the computing system 200 may present a graphical user interface (GUI) via the user interface 214. For instance, FIG. 4 illustrates a GUI 250 that may be presented using the user interface 214. The GUI 250 may include any GUI object used to display multiple parts of information. For instance, the illustrated embodiment of the GUI 250 includes a visual task board that includes a main body 252 that displays multiple cards 254 each pertaining to a corresponding task or tasks. Additionally or alternatively, the cards 254 in the GUI 250 may pertain to any corresponding object that may be assigned tags and/or users. As illustrated, the cards 254 may be arranged in lanes 256, 258, and 260. As illustrated, the lanes 256, 258, and 260 may include and/or be marked with categories to which the cards 254 may be organized. Each lane 256, 258, and 260 may include an add card button 262 that is used to add an additional card to a respective lane. The main body 252 may also include space 264 for additional lane(s) that may be added using an add lane button 266.

The GUI 250 also includes a header 268 located above the main body 252. In some embodiments, the main body 252 may be located above or next to the header 268. The header 268 includes a menu bar 270 and a quick filtering section 272.

The menu bar 270 may include a navigation button 274 that may be used to exit the page in the GUI 250. Additionally or alternatively, the menu bar 270 may include a title 276 for the page of the GUI 250 currently being displayed. The menu bar 270 may include a filter text box 278 that may be used to filter the cards 254. The menu bar 270 may also include a dialog button 280 that may be used to initiate dialog with an agent (e.g., a support agent for the platform 16). The menu bar 270 may include an information button 282 that, when selected, causes the GUI 250 to present additional information about the page and/or a selected card 254. The menu bar 270 may also include a user indicator 284 that may indicate a currently logged-in user and/or receive a selection to open a user login page or account information page. The menu bar 270 may also include a ticket button 286 that may be used to open a ticket related to the page. The menu bar 270 may also include an analytics button 288 that, when selected, causes the GUI 250 to display key performance analytics for the page, all of the cards 254, a portion (e.g., selected cards) of the cards 254, and the like. The GUI 250 may include an options button 290 that, when selected, may cause the GUI 250 to present options for displaying on the page all of the cards 254, a portion (e.g., selected cards) of the cards 254, and the like.

As illustrated, the quick filtering section 272 may include tag pills 292 that, when selected, are configured to cause the GUI 250 to filter the cards 254. For example, the tag pills 292 may have a color that causes only cards 254 having tag indicators 293 matching the selected color to be displayed in the GUI 250. As illustrated, each card 254 may include 0, 1, 2, or more tags associated in the respective card 254 as indicated by 0, 1, 2, or more tag indicators 293 displayed in each card 254. In some embodiments, the tags may be assigned to the respective cards 254 using a selection mechanism, such as a drag and drop of the corresponding tag pill 292, a selection in the card using a menu (e.g., a drop-down menu), and the like.

Although the illustrated tag pills 292 have a general elliptical shape, other embodiments may include different shapes for the tag pills 292. Additionally or alternatively, the illustrated embodiment of the GUI 250 may include colors for the tag pills 292 that match the corresponding tag indicators 293, while other embodiments may include other visual indicators to indicate that a specific tag pill 292 corresponds to a respective card 254.

The quick filtering section 272 may also include assignment pills 294 that correspond to users or objects that may be assigned to the cards 254. For example, a user may be assigned to complete a task corresponding to a card 254. After such an assignment, an assignment indicator 295 may be added to the corresponding card. As illustrated, each card may include 0, 1, 2, or more assigned users/objects indicated by 0, 1, 2, or more assignment indicators 295 indicated in the respective cards 254.

Although the illustrated assignment pills 294 have a general elliptical shape, other embodiments may include different shapes for the assignment pills 294. Additionally or alternatively, the illustrated embodiment of the GUI 250 includes colors or icons (e.g., portrait of user) for the assignment pills 294 that match the corresponding assignment indicators 295. Other embodiments, may include other visual indicators to indicate that a specific assignment pill 294 corresponds to a respective card 254.

As may be appreciated, the quick filtering section 272 may provide useful filtering in the GUI 250. However, the quick filtering section 272 may quickly include an unmanageable number of tag pills 292 and/or assignment pills 294. An unmanageable number of tag pills 292 and/or assignment pills 294 may overload the quick filtering section 272 interfering with the usefulness of the displayed tag pills 292 and/or assignment pills 294. Additionally, the unmanageable number of tag pills 292 and/or assignment pills 294 causes the header 268 to expand thereby limiting a portion of the GUI 250 that may be used for the main body 252.

Figure 5:
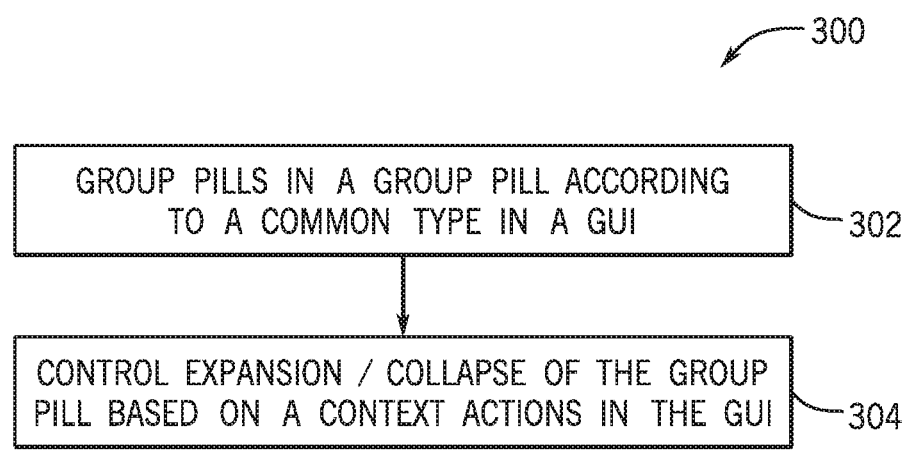
FIG. 5 is a block diagram of a process for expanding and collapsing a group pill based on context actions in the GUI of FIG. 4, in accordance with aspects of the present disclosure.

One method of reducing overloading is to limit the number of tag pills 292 and/or assignment pills 294. However, such limitations may also inhibit the usefulness of the quick filtering section 272 as much or more than overloading the quick filtering section 272. Instead of limiting the number of tag pills 292 and/or assignment pills 294, the tag pills 292 and/or assignment pills 294 may be combined into collapsible group pills. FIG. 5 illustrates a process 300 using collapsible group pills. Pills of a common type are grouped into a group pill in the GUI 250 (block 302). For example, the tag pills 292 may be grouped into a group pill. Additionally or alternatively, the assignment pills 294 may be grouped into a group pill. As discussed below, the group pills may have an expansion and/or collapse that is based on context actions of the GUI 250 (block 304). For example, some actions of a first context may cause the group pill to collapse while actions of a second context may cause the group pill to remain expanded and/or to expand.

Figure 6:
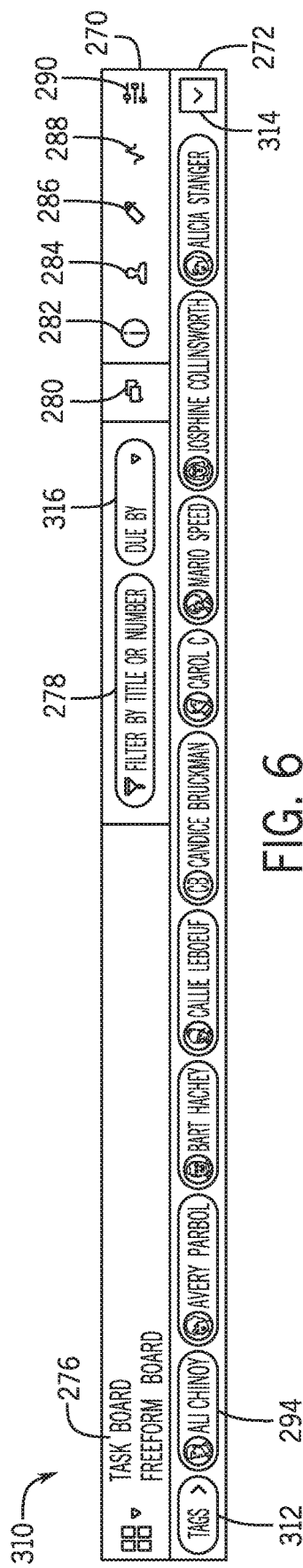
FIG. 6 is a portion of a GUI that includes a collapsed group pill, in accordance with aspects of the present disclosure.

FIG. 6 illustrates a collapsed group GUI 310 that includes a portion of a GUI with a collapsed group pill 312. The collapsed group GUI 310 also includes a collapse/expand button 314 that toggles a collapse of the quick filtering section 272 to a collapsed number of rows (e.g., 1) that is less than a number of maximum rows of the quick filtering section 272 such that the collapse/expand button 314 reduces an amount of rows displayed in the quick filtering section 272. For instance, the illustrated quick filtering section 272 is collapsed to a first number (e.g., 1) of rows while the quick filtering section 272 may display a different number (e.g., 3) of rows when the quick filtering section 272 is expanded using the collapse/expand button 314.

Figure 7:
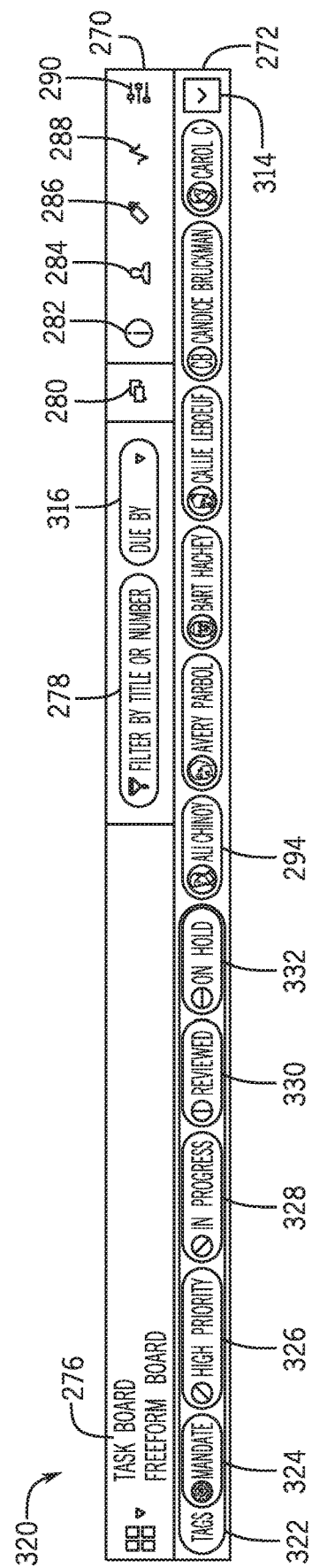
FIG. 7 is a portion of a GUI that includes an expanded group pill in a filtering context, in accordance with aspects of the present disclosure.

FIG. 7 illustrates an expanded group GUI 320 with a portion of a GUI that includes an expanded group pill 322. The collapsed group pill 312 may be expanded when the collapsed group pill 312 is selected (e.g., a selection of an arrow in the collapsed group pill 312). Additionally or alternatively, the collapsed group pill 312 may be expanded based on a particular context (e.g., filtering or assignments of the cards 254). For example, the collapsed group pill 312 may be expanded if text is entered into the filter text box 278, a tag indicator 293 is selected, an assignment indicator 295 is selected, or other such actions are completed.

As illustrated, when the collapsed group pill 312 is expanded, the expanded group GUI 320 displays the expanded group pill 322 includes tag pills 324, 326, 328, 330, and 332 that are part of a common category of pill. For example, the tag pills 324, 326, 328, 330, and 332 may correspond to tags that may be added to the cards 254. For example, the tag pill 324 may be used to indicate that a task corresponding to a card 254 may be mandated. The tag pill 326 may be used to indicate that the task is high priority. The tag pill 328 may be used to indicate that the task is in progress. The tag pill 330 may be used to indicate that the task is being reviewed and/or to-be-reviewed. The tag pill 332 may be used to indicate that the task is on hold.

As illustrated, the expanded group pill 322 may be a similar size in a first dimension (e.g., height or width) to the assignment pills 294 while expanded in a second dimension (e.g., width or height). As may be appreciated, when the expanded group pill 322 has a similar size in a dimension to the assignment pills 294, the tag pills (e.g., tag pills 324, 326, 328, 330, and 332) inside the expanded group pill 322 may have a smaller size in the dimension. For instance, the illustrated tag pills 324, 326, 328, 330, and 332 have a smaller height than the assignment pills 294. As long as a context (e.g., filtering or assignment actions) remains, the expanded group pill 322 remain expanded. For instance, the tag pill 324 may be selected for filtration of the cards 254. After selection of the tag pill 324, the expanded group pill 322 displays the selected tag pill 324 with an indicator of selection and application of filtration, as illustrated in an expanded pill GUI 340 in FIG. 8.

As discussed below, a context change may cause the expanded group pill 322 to be collapsed back into the collapsed group pill 312, as illustrated in a collapsed pill GUI 342 in FIG. 9. When the collapse occurs any of the pills selected in the expanded group pill 312 may still be displayed in the collapsed group pill 312. For instance, if the tag pill 324 is selected before collapsed, the tag pill 324 is remains visible even when the group pill is collapsed into the collapsed group pill 312.

Figure 10:
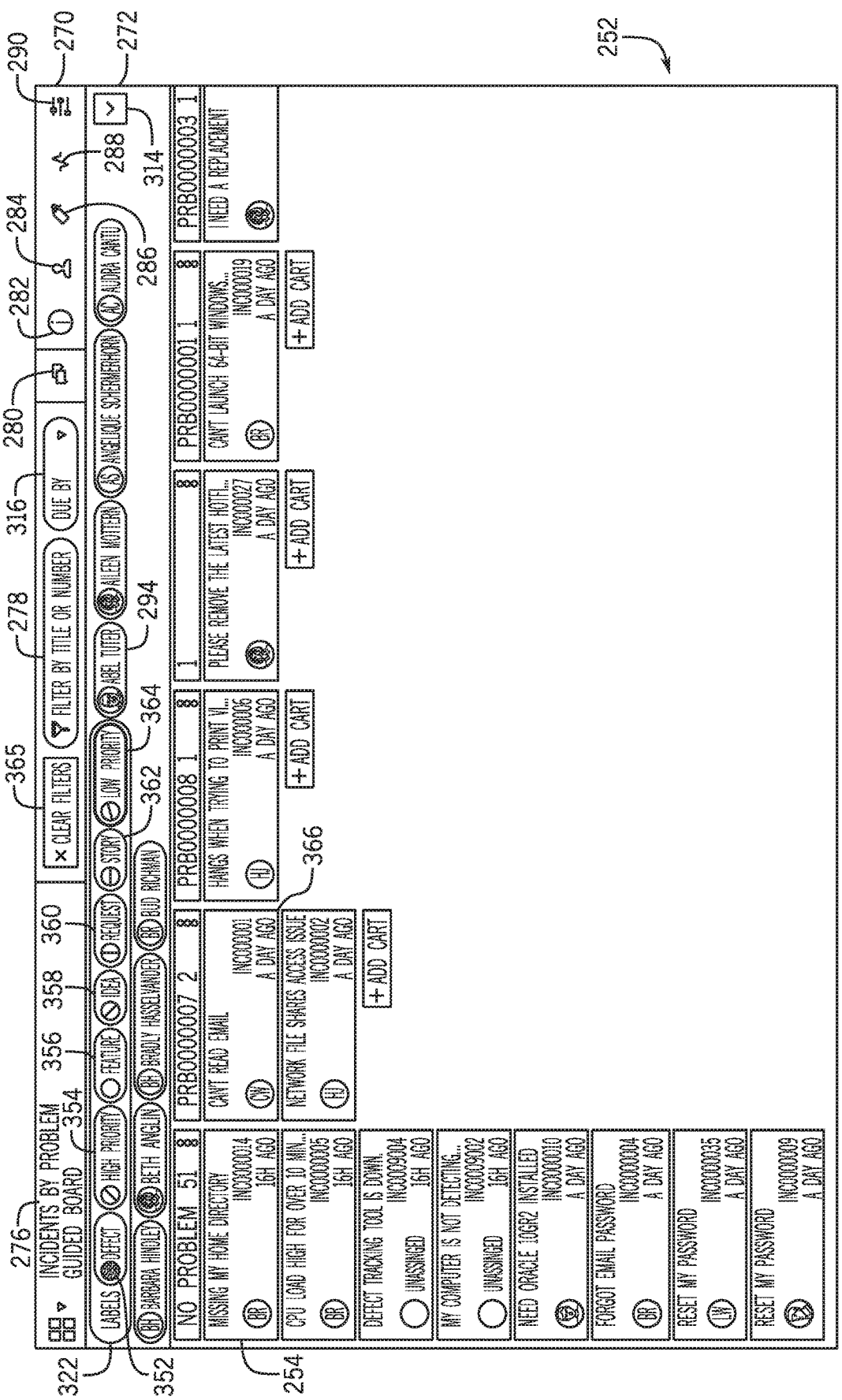
FIG. 10 is a GUI that includes an expanded group pill that may be used to assign tags or assign user and/or objects to tasks corresponding to cards in the GUI, in accordance with aspects of the present disclosure.

FIG. 10 illustrates a filtering context GUI 350 that includes the expanded group pill 322 with tag pills 352, 354, 356, 358, 360, 362, and 362. The tag pills 352, 354, 356, 358, 360, 362, and 362 may each correspond to various tags that may be assigned to the cards 254. For example, the tag pill 352 may be used to assign a defect tag or to filter the cards 254, upon selection of the tag pill 352, to only display the cards 254 that have been tagged as defective. The tag pill 354 may be used to assign a high priority tag or to filter the cards 254, upon selection of the tag pill 354, to only display the cards 254 that have been tagged as high priority. The tag pill 356 may be used to assign a feature tag or to filter the cards 254, upon selection of the tag pill 356, to only display the cards 254 that have been tagged as indicating that the card corresponds to a feature rather than to a defect. The tag pill 358 may be used to assign an idea tag or to filter the cards 254, upon selection of the tag pill 358, to only display the cards 254 that have been tagged as corresponding to an idea for future implementation. The tag pill 360 may be used to assign a request tag or to filter the cards 254, upon selection of the tag pill 360, to only display the cards 254 that have been tagged as including a request for future features. The tag pill 362 may be used to assign a story tag or to filter the cards 254, upon selection of the tag pill 362, to only display the cards 254 that have been tagged as containing a story or a part of a story. The tag pill 364 may be used to assign a low priority tag or to filter the cards 254, upon selection of the tag pill 364, to only display the cards 254 that have been tagged as low priority.

Figure 11:
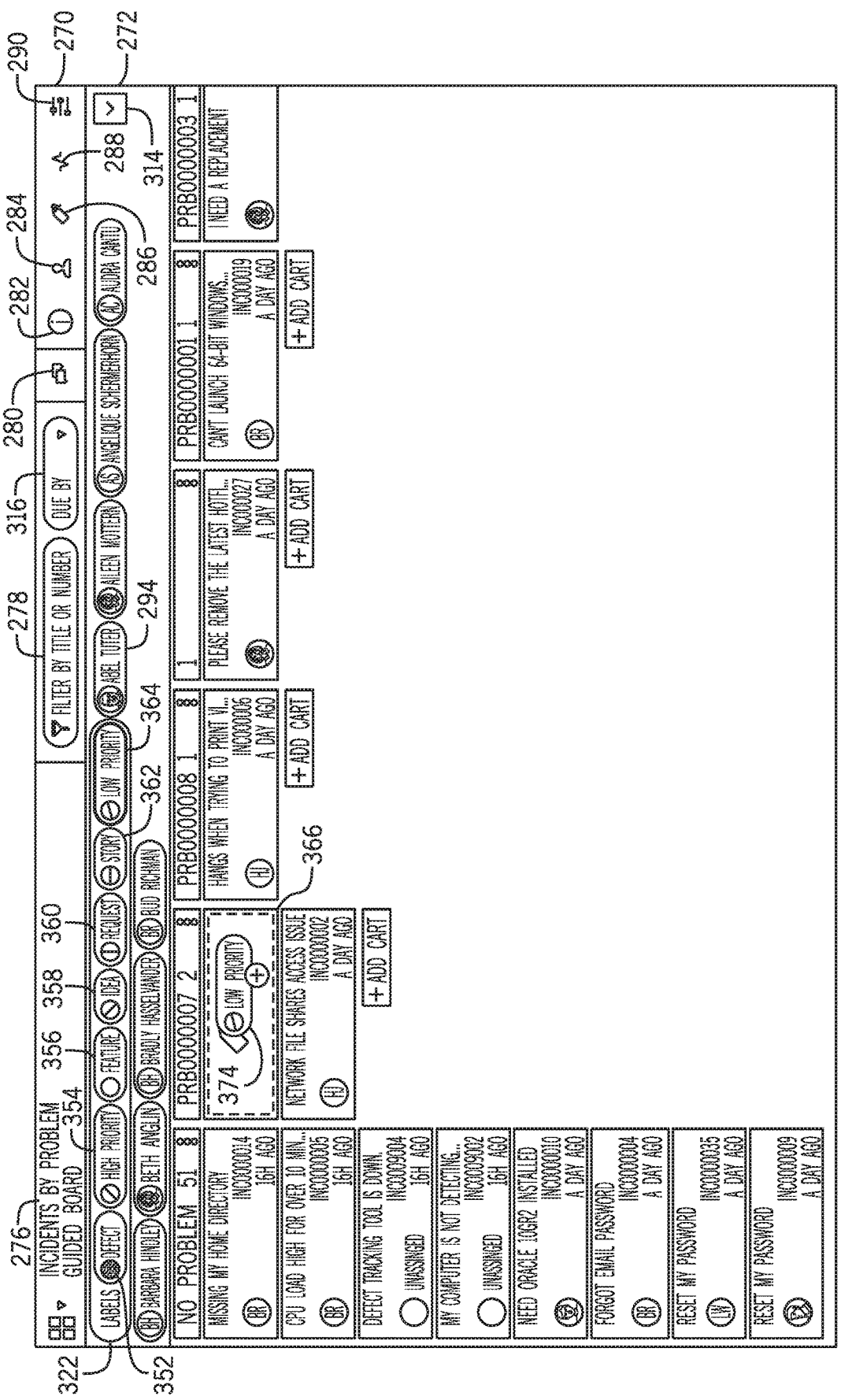
FIG. 11 is a GUI showing an assignment in the GUI of FIG. 10, in accordance with aspects of the present disclosure.

Additionally or alternatively, a tag corresponding to the tag pill 364 may be assigned to cards 254 (e.g., card 366) using a selection of the tag pill 364. For example, FIG. 11 shows a filtering context GUI 372 that is used to assign a tag to the card 366. In some embodiments, assigning a tag may be deemed as part of the filtering process and may keep the filtering context active. Additionally or alternatively, such assignments may be made even when a filtering context is not active in the GUI. Regardless of context, the tag pill 364 may be selected and dragged to the card 336 to assign a low priority tag to the card 366. Accordingly, a tagging indicator 374 may be dragged from the tag pill 364 to the card 336 to assign the tag to the card 366. Additionally or alternatively, the tag pill 364 may be associated with the card 366 using any suitable mechanism. In some embodiments, the tagging indicator 374 may change when the tagging indicator 374 is over a card 254 or 336 to indicate that tagging will be assigned when an input device (e.g., mouse, trackpad, or touchscreen) has received an indication of an action (e.g., release of a press, a press, and the like).

Returning to FIG. 10, the filtering context GUI 350 may include one or more buttons (e.g., a clear filter button 365) that may be used to change context and/or remove active filters used to filter the cards 254 in the main body 252. Additionally or alternatively, the filtering context may be ended when a non-filtering and/or non-assignment action is performed. For example, the filtering context may be ended in the filtering context GUI 350 when any of the cards 254 are moved between lanes 367, 368, and 370 (as discussed below in relation to FIGS. 14 and 15) as such changes may be used to indicate that the filtering context has ended. However, if filtering actions occur, (e.g., a tag is assigned/unassigned for the cards 254 and/or filters are applied/unapplied for the cards 254), the context remains active. Additionally or alternatively, the filtering context may be closed when no action has been performed within a threshold time of a previous action.

After a new tag has been added to at least some of the cards 254, an appearance of the respective cards 254 may be updated to indicate such assignments with additional tag indicators 293. Inversely, such tag indicators 293 may be removed when a tag has been removed from a respective card 254.

Figure 12:
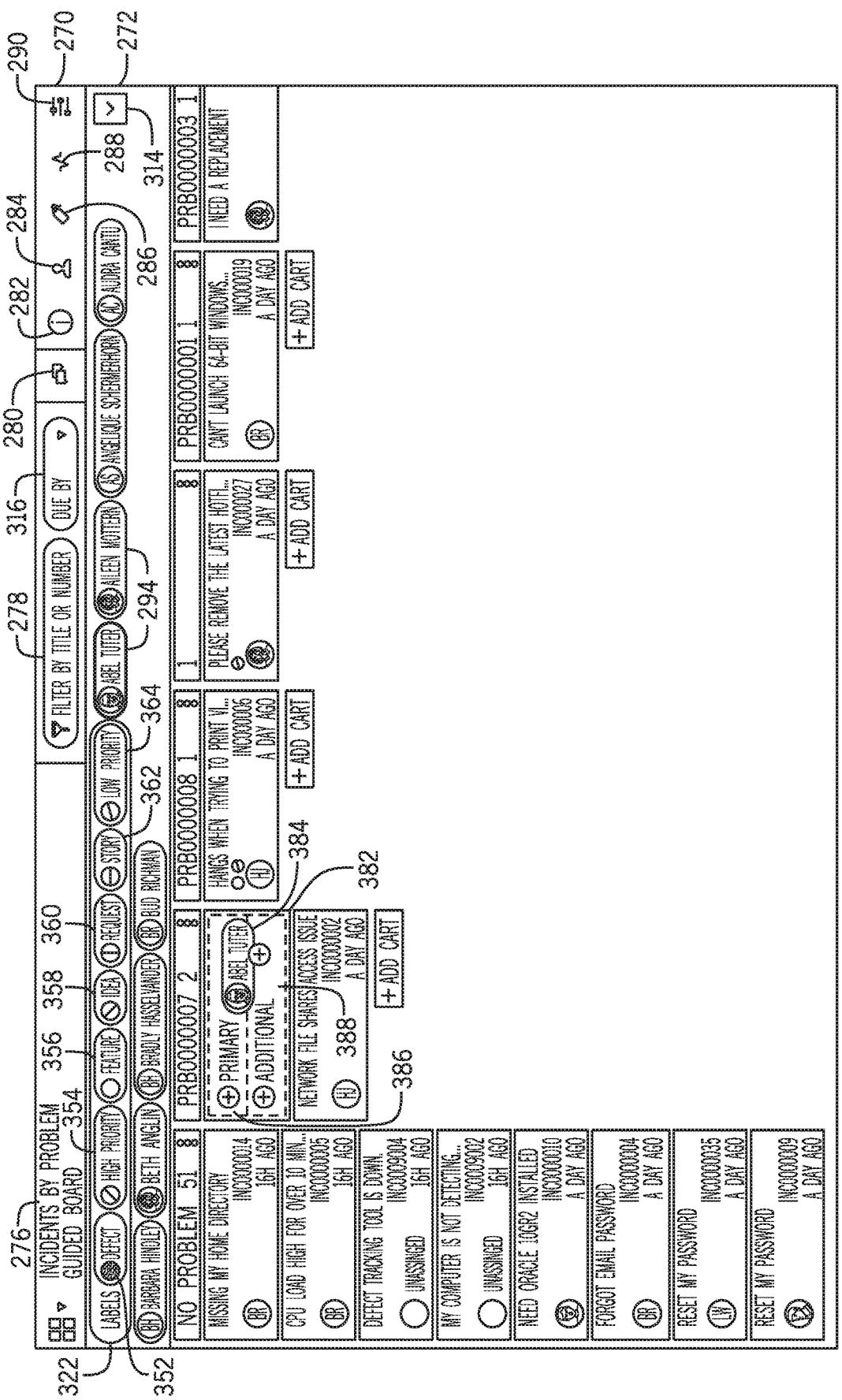
FIG. 12 is a GUI showing an assignment to a primary or additional role in the GUI of FIG. 10, in accordance with aspects of the present disclosure.

In some embodiments, the cards 254 may be assigned to more than a single object or user. For example, FIG. 12 illustrates an embodiment of a GUI 380 that may be used to assign one or more users or objects using corresponding assignment pills 294. Since multiple users or objects may be assigned to a card 254, the assignments may include different tiers of assignments. For example, one user and/or object may be a primary assigned user/object while other users and/or objects may be assigned as secondary or additional users/objects. To select such tiers/roles, the GUI 380 may present such corresponding portions of a card 382 when a moving pill 384 is moved over the card 382. In some embodiments, an appearance of the card 382 may change to include a primary portion 386 and a secondary portion 388. When the moving pill 384 is placed in the primary portion 386, the user/object corresponding becomes the primary user/object assigned to the card 382. In embodiments where only a single user/object may be assigned to the primary role, when a new object/user is assigned to the primary role, a previous primary object/user may be moved to an additional object/user role or may be removed from assignment to the card 382 entirely.

Figure 13:
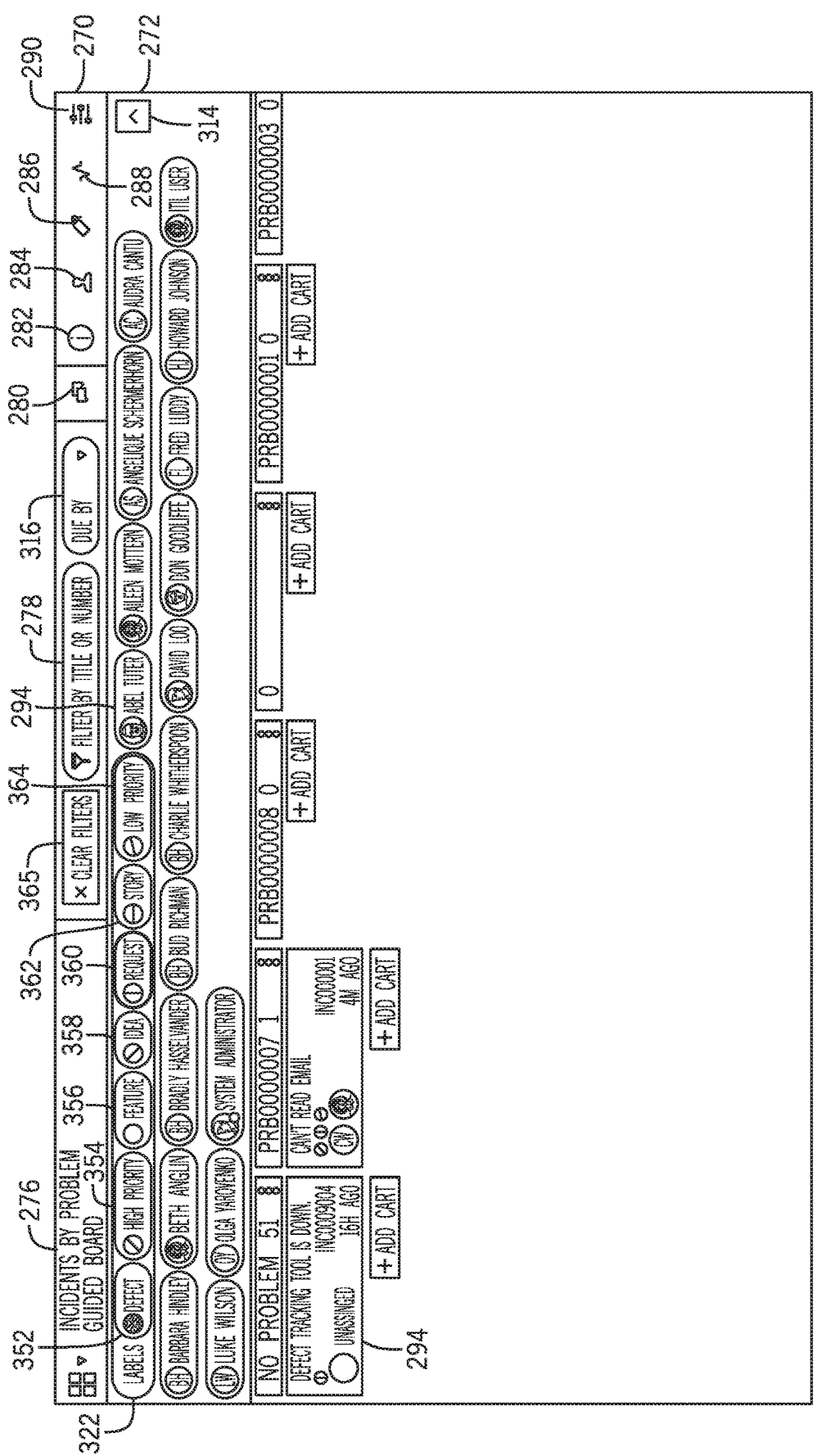
FIG. 13 is a GUI showing filtered results of FIG. 10, in accordance with aspects of the present disclosure.

As illustrated in FIG. 13, after cards 254 are assigned, a filtered GUI 390 may be presented with only cards 254 that are assigned and/or tagged with selected pills. For instance, the filtered GUI 390 presents only cards 254 that have been tagged with the tag pill 360 (e.g., indicating that the card is related to a requested feature).

Figure 14:
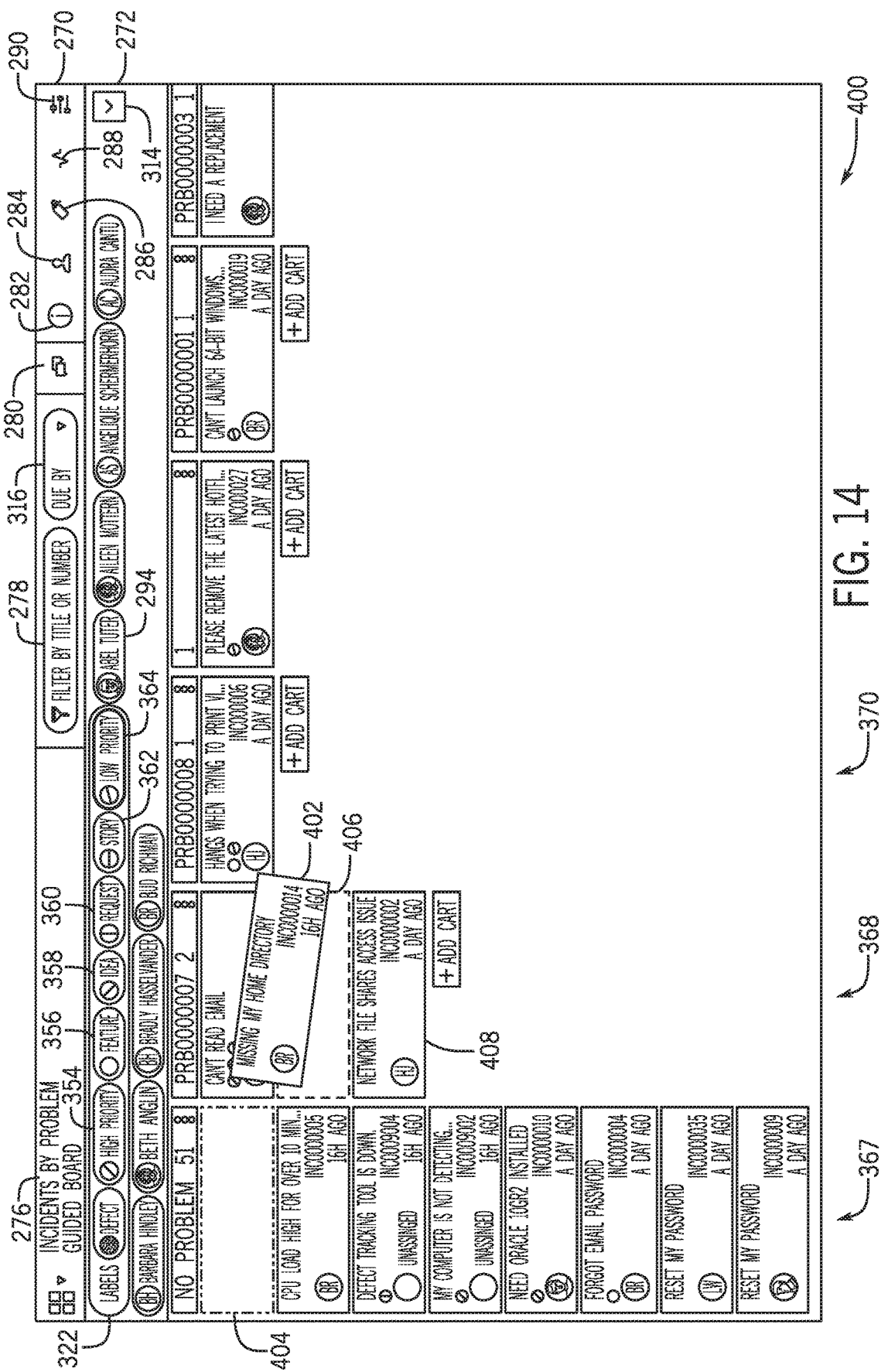
FIG. 14 is a GUI showing a movement of a card while in a filtering context, in accordance with aspects of the present disclosure.
Figure 15:
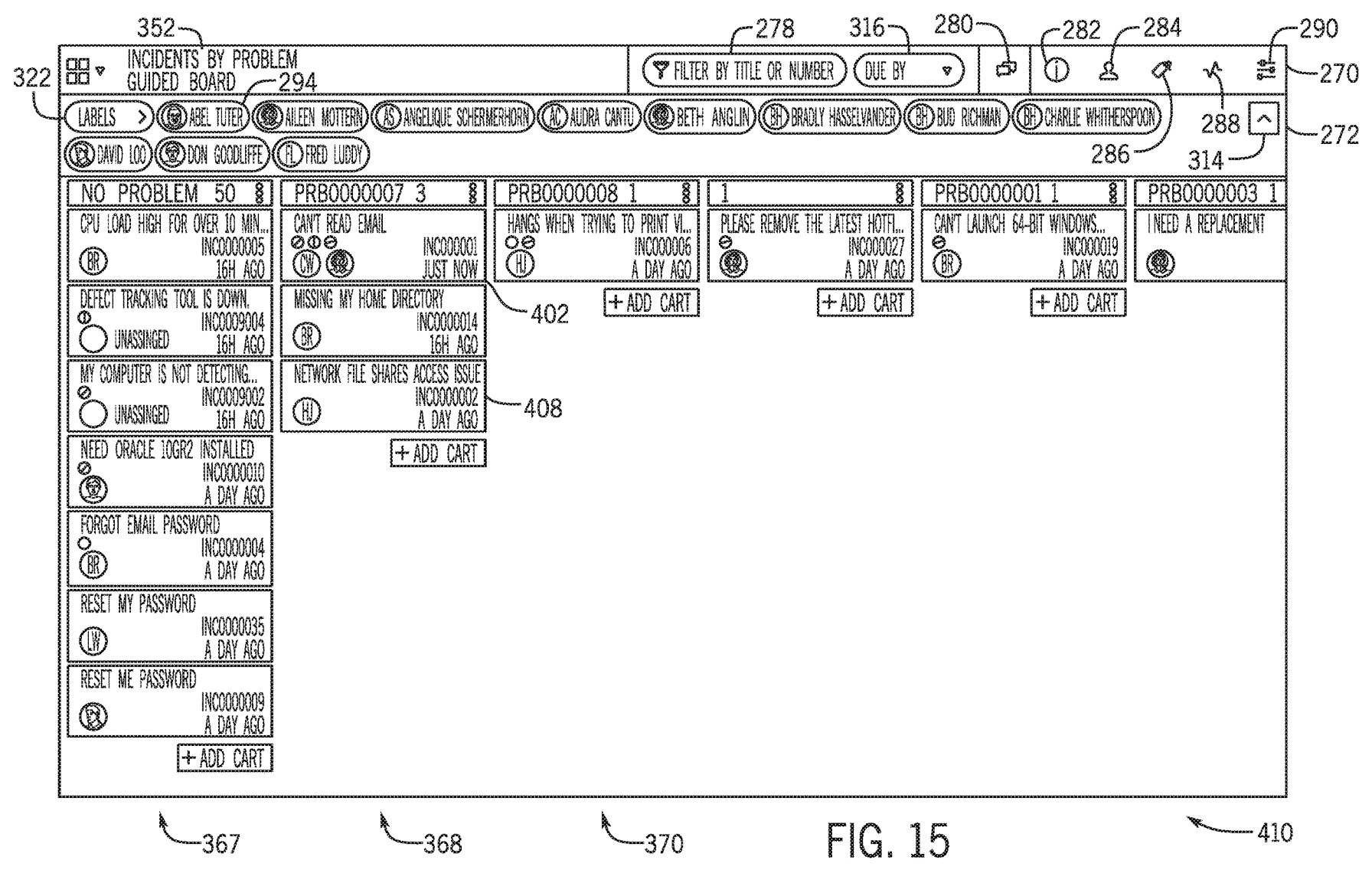

As previously discussed, a filtering context may be ended when a non-filtering action occurs causing the expanded group pill 322 to be collapsed. For instance, FIG. 14 illustrates a filtering context GUI 400 in which a non-filtering action is performed. In the illustrated embodiment, the non-filtering action includes a move of a card 402 from a lane 367 to a lane 368. Additionally or alternatively, the non-filtering action may include any other action unrelated to filtering, such as creating new cards, importing cards, editing cards, etc. Returning to FIG. 14, when the card 402 is currently being moved, a location 404 from which the card 402 has moved may be kept vacant until the move has completed. Furthermore, a location 406 where the card 402 may be located after the movement has been completed. As illustrated in a relocated card GUI 410 of FIG. 15, upon completion of the move, the card 402 is placed in the lane 370. However, since a non-filtering action has been performed, the relocated card GUI 410 displays that the filtering context has been ended with the collapsed group pill 312 replacing the expanded group pill 322 from FIG. 13.

Figure 16:
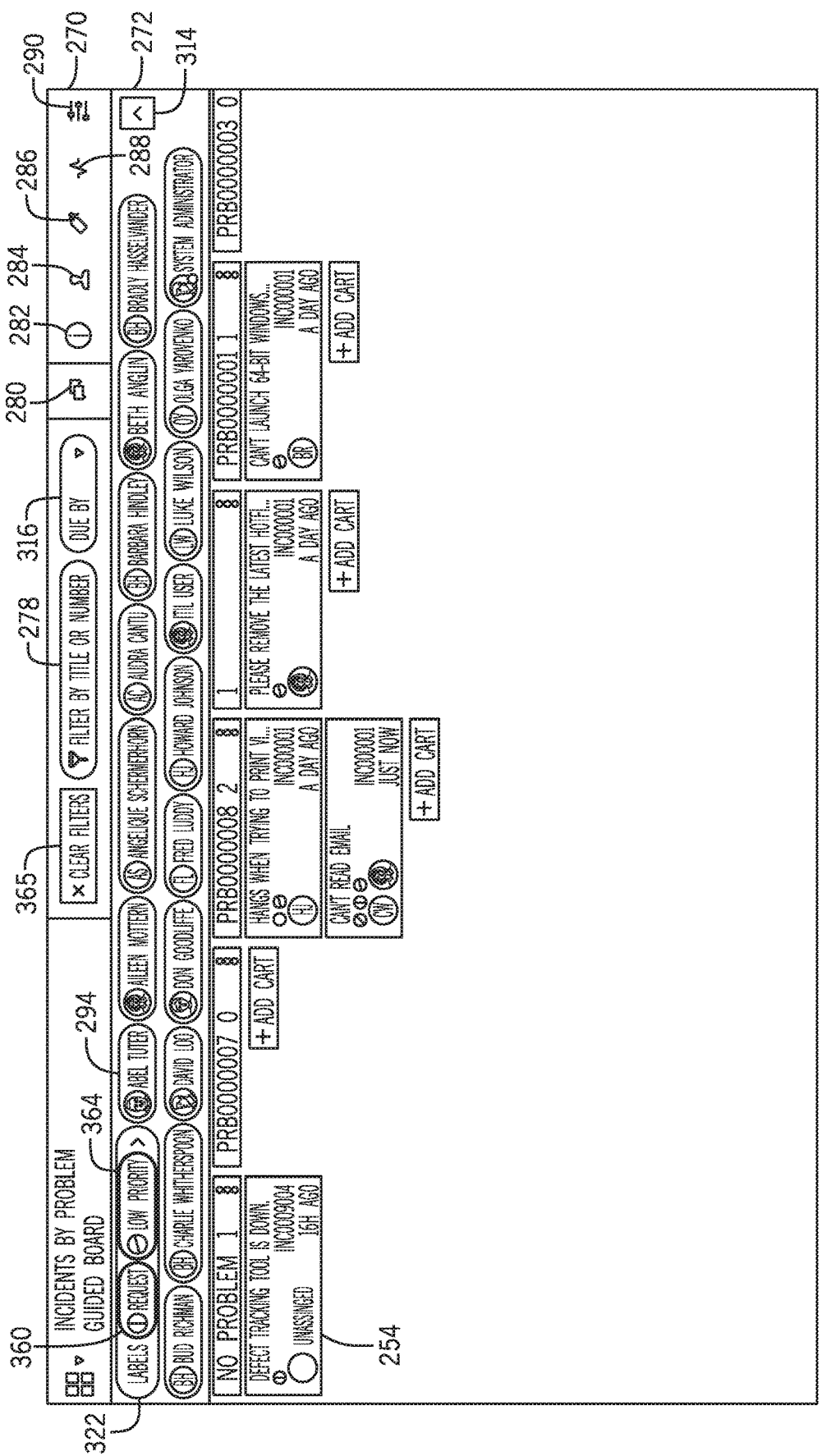
FIG. 16 is a GUI showing a collapsed group pill with multiple tags assigned and displayed in the collapsed group pill, in accordance with aspects of the present disclosure.

When the filtering context is closed, the collapsed group pill 312 is presented. Although the collapsed group pill 312 is collapsed relative to the expanded group pill 322, the collapsed group pill 312 may still present selected pills while collapsing pills that have not been selected. For instance, as illustrated in FIG. 16, a GUI 420 may include the collapsed group pill 312 that collapses all tag pills other than tag pills 360 and 364.

Figure 17:
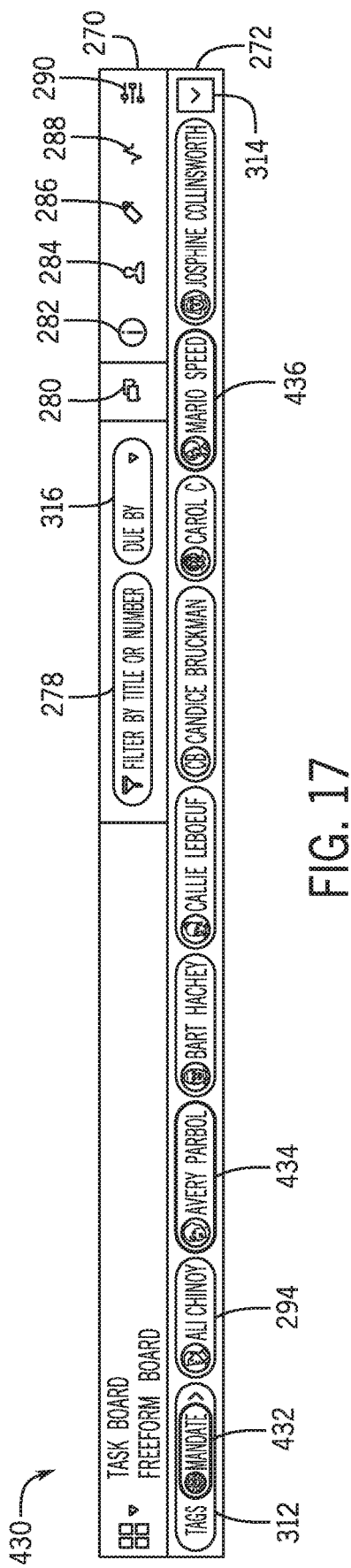
FIG. 17 is a portion of a GUI showing multiple assignment pills selected in a collapsed group filtering section, in accordance with aspects of the present disclosure.
Figure 18:
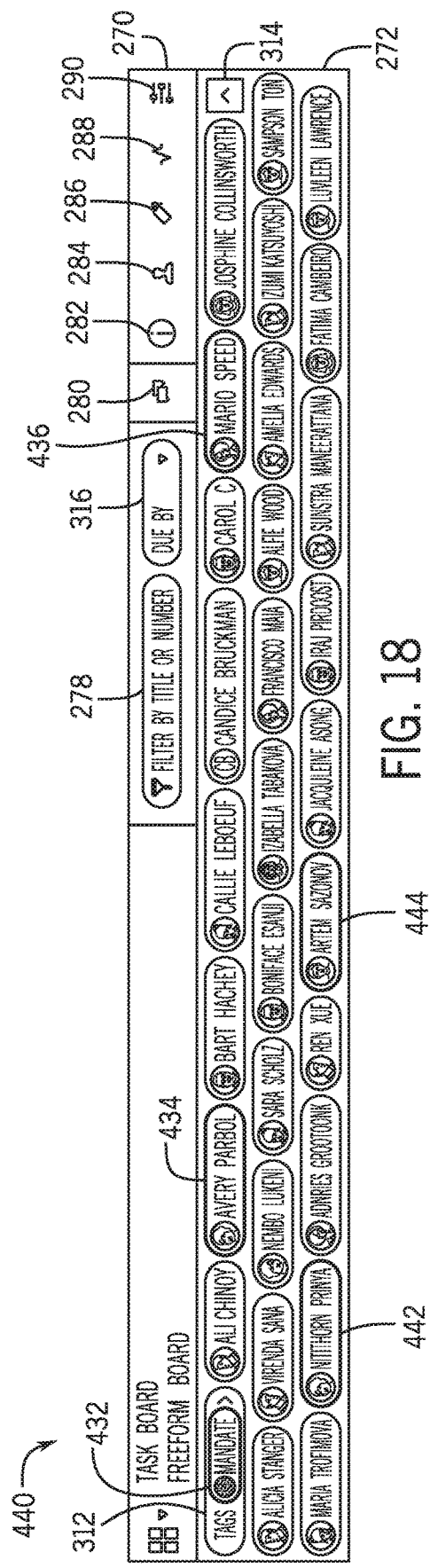
FIG. 18 is a portion of a GUI showing multiple assignment pills with an expanded group filtering section, in accordance with aspects of the present disclosure.

Similarly, multiple assignment pills 294 may selected. For instance, in FIG. 17, a portion of a GUI 430 is presented with the collapsed group pill 312 including a single tag pill 432 selected while assignment pills 434 and 436 are selected. Accordingly, in the GUI 430, only cards tagged with the single tag pill 432 and the assignment pills 434 and 436 would be presented. In some situations, the assignment pills 294 to be selected may not be presentable in a single line. Accordingly, to show additional assignment pills 294, the collapse/expand button 314 may be used to change how many assignment pills 294 are displayed in the quick filtering section 272 by resizing the quick filtering section 272 to a different number of rows. For instance, FIG. 18, displays a portion of a GUI 440 that has the quick filtering section 272 expanded to three rows. When the quick filtering section 272 is expanded, an appearance of the collapse/expand button 314 may change to show that selection of the collapse/expand button 314 will collapse the quick filtering section 272 rather than expand the quick filtering section 272. Due to the expansion, the quick filtering section 272 presents assignment pills 442 and 444 that may be selected and that may hidden when the quick filtering section 272 is in a collapsed format, such as shown in the GUI 430.

Figure 19:
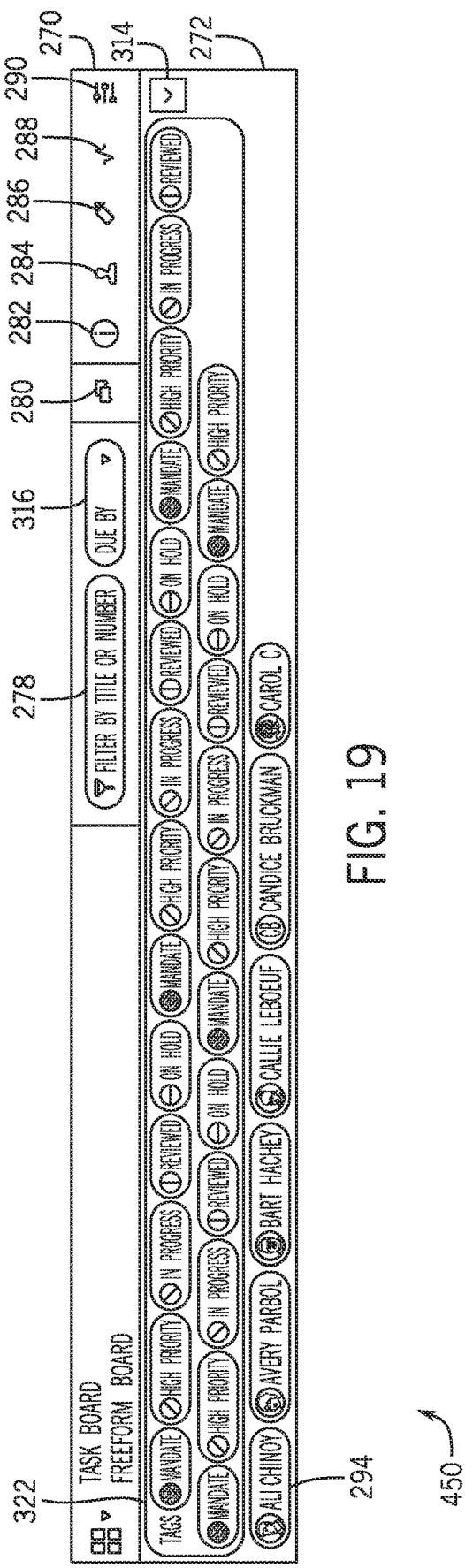
FIG. 19 is a portion of a GUI showing an expanded group pill that extends across multiple rows of a quick filtering section, in accordance with aspects of the present disclosure.

Additionally or alternatively, in some embodiments, the quick filtering section 272 may expanded beyond a collapsed length (e.g., single row) due to an expanded group pill 322 and the assignment pills 294 taking more space than a single row in the quick filtering section 272. FIG. 19 illustrates an embodiment of a quick filtering section 272 with three rows due to the expanded group pill 322 extending between two complete rows with assignment pills 294 in a third row. Although the expanded group pill 322 includes two rows, the expanded group pill 322 may have any number of rows. For example, the expanded group pill 322 may include 1, 2, 3, 4, or more rows. Also, the collapsed quick filtering section may have any number of rows of assignment pills 294. Furthermore, a number of assignment pills 294 in a collapsed quick filtering section may be dynamically determined by an amount of assignment pills 294 that may be used to fill a row in the quick filtering section 272. For instance, when space for a number (e.g., 6) of assignment pills 294 is left in a row of the quick filtering section 272 due to the expanded group pill 322 consuming a remainder of the row, the number of assignment pills 294 are presented in the quick filtering section. However, when the collapsed group pill 312 is presented, a different number (e.g., 9) of assignment pills 294 are presented due a different amount space remaining in a last row(s) of the quick filtering section 272. In some embodiments, the number of assignment pills 294 presented in the collapsed quick filtering section 272 may have a minimum, such that where the space in a last row accommodates fewer (e.g., 0) than the minimum, the assignment pills 294 may extend onto a different row of the quick filtering section 272.

Figure 20:
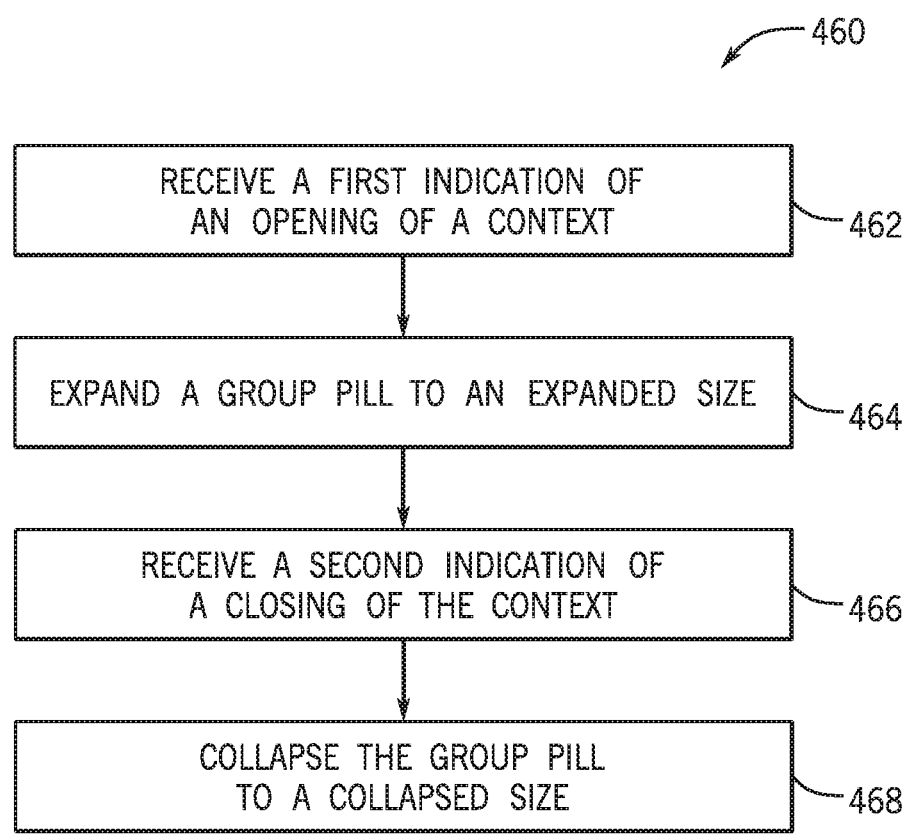
FIG. 20 is a flow diagram of a process that may be employed to present information in a GUI using a dynamic group pill, in accordance with aspects of the present disclosure.

FIG. 20 is a flow diagram of a process 460 that may be used to control toggling between expanded and collapsed versions or mods of the group pill (e.g., the collapsed group pill 312 and the expanded group pill 322). A processing device used to implement the GUIs disclosed herein receives a first indication of an opening of a context related to a first type of action in the GUI (block 462). The first indication may include a selection of the expansion button collapsed group pill 312, receiving text typed into the filter text box 278 (i.e., search bar), a selection of an assignment pill 294, or a selection of a displayed pill in the collapsed group pill. The first type of actions may include any filtering action, such as those listed previously as possible first indications or other filtering actions.

The GUI expands a collapsed group pill 312 into an expanded group pill 322 based at least in part on receiving the first indication (block 464). The expansion may be similar to any of the previously discussed embodiments regarding expansion of the collapsed group pill 312.

The processing device also receives an indication of a closing of the context (block 466). The second indication may include a non-filtering action, such as moving a card 254 between lanes of the GUI, a lack of interaction with the GUI within a threshold period of time, a selection of an end filtering context button in the expanded group pill 322, a selection of a clear filters button 365, and/or other non-filtering actions. In response to the receipt of the second indication, the processing device collapses the expanded group pill 322 into the collapsed group pill 312 (block 468).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving a first indication of an opening of a context related to a first type of action in a graphical user interface;
expanding a group pill to an expanded size based at least in part on receiving the first indication;
receiving a second indication of a closing of the context related to a second type of action, wherein the second type of action comprises dragging and dropping a data object in the graphical user interface from a first region to a second region of a dashboard on the graphical user interface; and
collapsing the group pill to a collapsed size displaying less information than the expanded size in response to dragging and dropping the data object.

2. The method of claim 1, wherein the first type of action comprises a filtering action, and the second type of action corresponding to the second indication comprises a non-filtering action.

3. The method of claim 1, wherein the first indication comprises a selection of a button in the group pill.

4. The method of claim 1, wherein the first indication comprises receiving text typed into a search bar.

5. The method of claim 1, wherein the first indication comprises a selection of an assignment filter in the graphical user interface via a selection of a corresponding assignment pill in the graphical user interface.

6. The method of claim 1, wherein the first indication comprises a selection of a displayed pill in the group pill.

7. A tangible, non-transitory, and computer-readable medium having stored thereon instructions, that when executed by one or more processors, are configured to cause the one or more processors to:
present, via an electronic display, a graphical user interface comprising:
a plurality of cards corresponding to a plurality of tasks; and
a group pill having a plurality of tag pills presented inside of the group pill, wherein each of the plurality of tag pills correspond to a tag associable with each of the plurality of cards; and
update the graphical user interface to collapse the group pill from an expanded version to a collapsed version in response to receiving an input dragging and dropping at least one card of the plurality of cards from a first region to a second region in the graphical user interface.

8. The tangible, non-transitory, and computer-readable medium of claim 7, wherein the instructions are configured to cause the one or more processors to:
receive a selection of a tag pill of the plurality of tag pills in the graphical user interface; and
in response to the selection of the tag pill, filter the plurality of cards to display only cards that have been associated with the tag corresponding to the selected tag pill.

9. The tangible, non-transitory, and computer-readable medium of claim 8, wherein filtering the plurality of cards comprises changing a color of selected tag pill in the group pill.

10. The tangible, non-transitory, and computer-readable medium of claim 7, wherein the instructions are configured to cause the one or more processors to:
receive a selection of a tag pill of the plurality of tag pills; and
associate the respective tag to a selected card of the plurality of cards.

11. The tangible, non-transitory, and computer-readable medium of claim 7, wherein the instructions are configured to cause the one or more processors to change a size of a quick filtering section in response to transitioning between the expanded version or the collapsed version of the group pill.

12. The tangible, non-transitory, and computer-readable medium of claim 7, wherein the plurality of tag pills comprise:

a high priority pill that is configured to label a task that corresponds to a respective card as a high priority task; and an in-progress pill that is configured to label a task that corresponds to a respective card as in progress.

13. The tangible, non-transitory, and computer-readable medium of claim 7, wherein the group pill is configured to transition between the expanded version and the collapsed version, and wherein transitioning between the expanded version and the collapsed version comprises:

expanding or keeping the group pill expanded for filtering actions; and collapsing or keeping the group pill collapsed for non-filtering actions.

14. The tangible, non-transitory, and computer-readable medium of claim 13, wherein the non-filtering actions comprise dragging and dropping the at least one card of the plurality of cards from the first region to the second region in the graphical user interface.

15. A system, comprising:
one or more processors; and
a memory storing instructions, that when executed by the one or more processors, are configured to cause the one or more processors to:
  present a graphical user interface comprising:
    a plurality of cards corresponding to a plurality of tasks; and
    a quick filtering section comprising:
      a group pill; and
      a plurality of assignment pills; and
  update the graphical user interface to collapse the group pill from an expanded mode to a collapsed mode in response to receiving an input dragging and dropping a card of the plurality of cards from a first region to a second region in the graphical user interface.

16. The tangible, non-transitory, and computer-readable medium of claim 7, wherein the instructions are configured to cause the one or more processors to toggle between the expanded version and the collapsed version based at least in part on context actions within the graphical user interface, wherein the context actions comprise a filtering action and a non-filtering action, wherein the non-filtering action comprises dragging and dropping the at least one card of the plurality of cards from the first region to the second region in the graphical user interface.

17. The system of claim 15, wherein the instructions are configured to cause the one or more processors to toggle between the expanded mode and the collapsed mode based at least in part on a type of action, wherein the type of action comprises a non-filtering action and a filtering action, wherein the non-filtering action comprises dragging and dropping the card of the plurality of cards from the first region to the second region in the graphical user interface.

18. The system of claim 15, wherein the quick filtering section comprises an expand/collapse button, and wherein the instructions are configured to cause the one or more processors to:
receive selection of the expand/collapse button;
change a number of assignment pills displayed in the quick filtering section based at least in part on the selection of the expand/collapse button;
receive an indication of an action occurring in the graphical user interface; and
transition between the expanded mode and the collapsed mode based at least in part on a type of the action.

* * * * *